United States Patent [19]

Loeffler et al.

[11] Patent Number: 5,216,137
[45] Date of Patent: Jun. 1, 1993

[54] DOUBLED PHENYL AZO NAPHTHALENE REACTIVE DYES HAVING FOUR HALOTRIAZINE REACTIVE GROUPS AND A PHENYLENE DIAMINE SERIES BRIDGE MEMBER

[75] Inventors: Hermann Loeffler, Speyer; Manfred Patsch, Wachenheim; Reinhold Krallmann, Weisenheim, all of Fed. Rep. of Germany

[73] Assignee: BASF Aktiengesellschaft, Ludwigshafen, Fed. Rep. of Germany

[21] Appl. No.: 726,242

[22] Filed: Jul. 5, 1991

[30] Foreign Application Priority Data

Jul. 7, 1990 [DE] Fed. Rep. of Germany ....... 4021727

[51] Int. Cl.$^5$ ..................... C09B 62/09; D06P 1/382; D06P 3/32; D06P 3/66
[52] U.S. Cl. .................................. 534/634; 534/638; 534/582
[58] Field of Search ......................................... 534/634

[56] References Cited

U.S. PATENT DOCUMENTS 3,474,084 10/1969 Griffiths et al. ............... 534/634 X
4,066,389 1/1978 Riat et al. ...................... 534/634 X

FOREIGN PATENT DOCUMENTS 0387579 9/1990 European Pat. Off. ............ 534/634
3135432 3/1983 Fed. Rep. of Germany ...... 534/634
1439996 4/1966 France ................................ 534/634
2297899 1/1976 France ................................ 534/634
50-40686 3/1977 Japan ................................... 534/634
53-27628 3/1978 Japan ................................... 534/634

OTHER PUBLICATIONS

Chemical Abstracts, vol. 87, No. 6, Aug. 8, 1977, Columbus, Ohio Abstract No. 40684D, S. Takahashi, et al I, p. 61.
Chemical Abstracts, vol. 89, No. 14, Oct. 2, 1978, Columbus, Ohio Abstract No. 112326E, S. Takahashi, et al II, p. 155.

Primary Examiner—Floyd D. Higel
Attorney, Agent, or Firm—Oblon, Spivak, McClelland, Maier & Neustadt

[57] ABSTRACT

Azo reactive dyes useful for dyeing or printing hydroxyl- or nitrogen-containing substrates have the formula

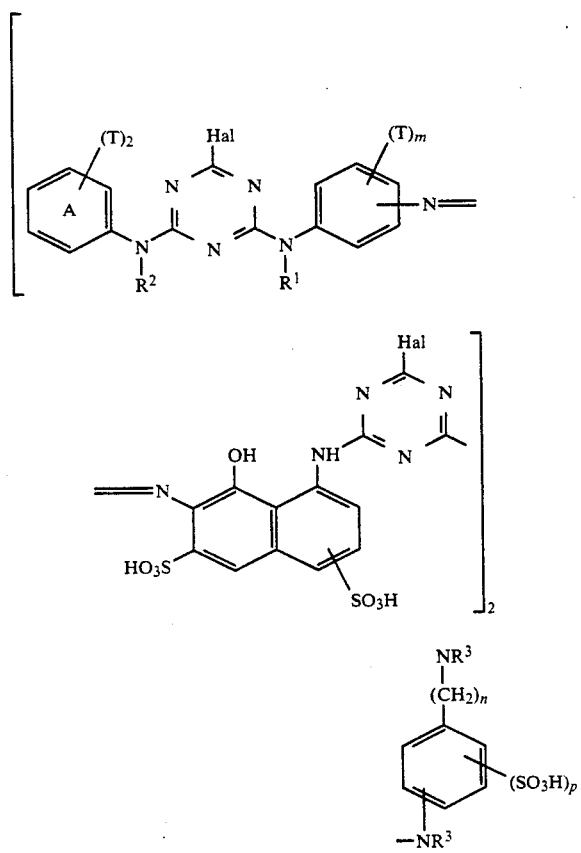

where
m is 0, 1 or 2,
n is 0 or 1,
p is 0 or 1,
$R^1$ and $R^2$ are each independently of the other hydrogen or substituted or unsubstituted $C_1-C_4$-alkyl,
$R^3$ is hydrogen, methyl or ethyl,
T is carboxyl or hydroxysulfonyl,
Hal is fluorine or chlorine, and
the ring A may be benzofused or substituted.

3 Claims, No Drawings

DOUBLED PHENYL AZO NAPHTHALENE REACTIVE DYES HAVING FOUR HALOTRIAZINE REACTIVE GROUPS AND A PHENYLENE DIAMINE SERIES BRIDGE MEMBER

The present invention relates to novel azo reactive dyes of the formula I

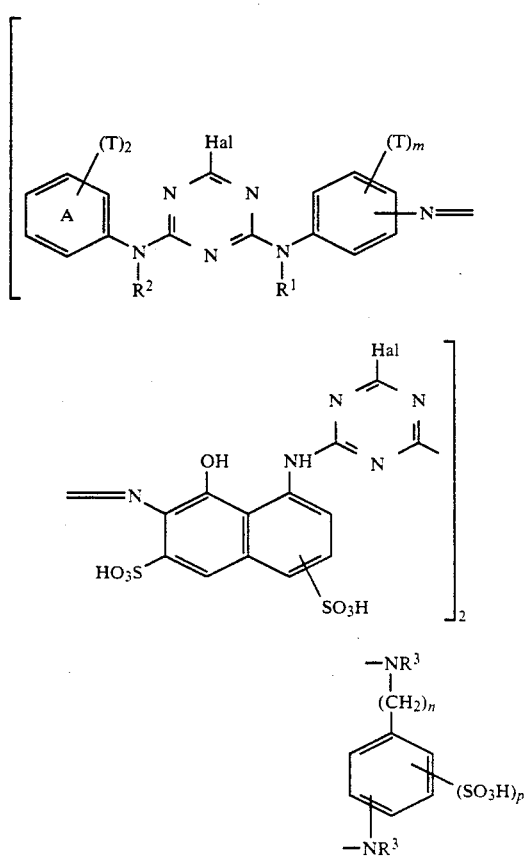

where
m is 0, 1 or 2,
n is 0 or 1,
p is 0 or 1,
$R^1$ and $R^2$ are identical or different and each is independently of the other hydrogen or $C_1$-$C_4$-alkyl which may be substituted by hydroxyl, $C_1$-$C_4$-alkoxy, halogen, cyano, carboxyl or hydroxysulfonyl,
$R^3$ is hydrogen, methyl or ethyl,
T is carboxyl or hydroxysulfonyl,
Hal is fluorine or chlorine, and
the ring A may be benzofused or substituted by $C_1$-$C_4$-alkyl, $C_1$-$C_4$-alkoxy or halogen,
and to the use of the novel dyes for dyeing or printing hydroxyl- or nitrogen-containing substrates.

The novel azo reactive dyes of the formula I are shown in the form of the free acids. However, their salts, in particular their alkali metal salts, are of course also encompassed.

JP-A-27 628/1978 and DE-A-3 135 432 disclose reactive dyes which are similar to those of the formula I. However, they differ therefrom either in respect of the bridge member which links the two chromophore moieties or in the number of hydroxysulfonyl groups.

It has been found that these dyes still have application defects.

Earlier EP-A-387 579 concerns similar azo reactive dyes. However, they differ either in the number or in the position of the hydroxysulfonyl groups.

It is an object of the present invention to make available novel azo reactive dyes which have advantageous properties, in particular a high fixation yield, and high wet fastness properties. In addition, the novel dyes shall give sufficiently rapid fixation at room temperature under practical conditions, for example in the cold pad-batch process.

We have found that this object is achieved by the azo reactive dyes of the formula I defined at the beginning.

Any alkyl appearing in the abovementioned formula I may be either straight-chain or branched.

If the ring A is benzofused, then the present invention also encompasses those azo reactive dyes in which either or both substituents T are situated in the fused benzene ring.

$R^1$ and $R^2$ are each for example methyl, ethyl, propyl, isopropyl, butyl, isobutyl, sec-butyl, 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, 2-chloroethyl, 2- or 3-chloropropyl, 2- or 4-chlorobutyl, 2-cyanoethyl, 3-cyanopropyl, 4-cyanobutyl, 2-hydroxysulfonylethyl, 3-hydroxysulfonylpropyl, 4-hydroxysulfonylbutyl, 2-carboxyethyl, 3-carboxypropyl or 4-carboxybutyl.

Suitable diazo components from which the radical

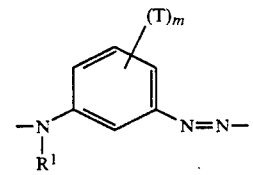

is derived are for example 1,3-diaminobenzene, 2,4-diaminobenzenesulfonic acid, 2,5-diaminobenzenesulfonic acid, 2,4-diaminobenzoic acid, 2,4-diaminobenzene-1,5-disulfonic acid and 2,5-diaminobenzene-1,4-disulfonic acid.

Radicals of the coupling component of the formula

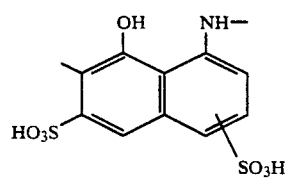

are for example

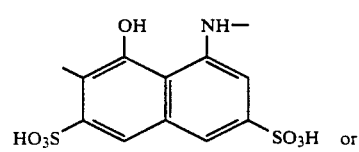 or

-continued

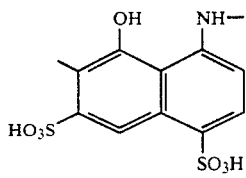

The radicals

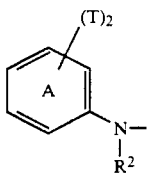

are derived for example from aniline-2,4-disulfonic acid, N-methylaniline- or N-ethylaniline-2,4-disulfonic acid, aniline-2,5-disulfonic acid, N-methylaniline- or N-ethylaniline-2,5-disulfonic acid, 2-amino-4-hydroxysulfonylbenzoic acid, 2-amino-5-hydroxysulfonylbenzoic acid, 2-methylamino- or 2-ethylamino-5-hydroxysulfonylbenzoic acid, 4-chloroaniline-2,5-disulfonic acid, 3-chloroaniline-4,6-disulfonic acid, 2-chloroaniline-4,5-disulfonic acid, 4-aminotoluene-2,5-disulfonic acid, 3-aminophthalic acid, 4-aminophthalic acid, aminoterephthalic acid, 1-aminonaphthalene-3,6- or -3,8-disulfonic acid, 1-amino-naphthalene-4,7-disulfonic acid and 2-aminohaphthalene-1,5-, -3,6- or -6,8-disulfonic acid.

Suitable radicals

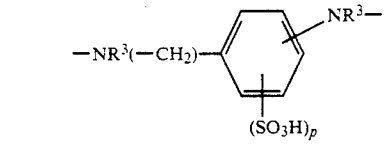

are for example derived from the following diamines:

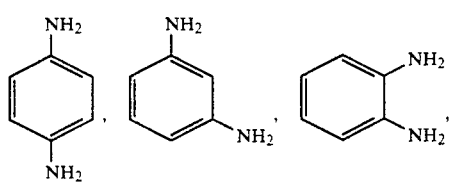

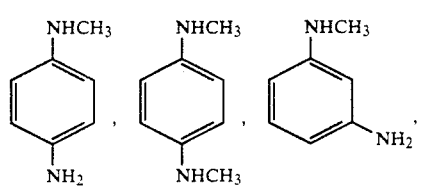

-continued

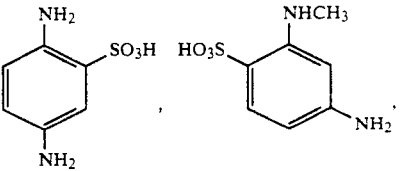

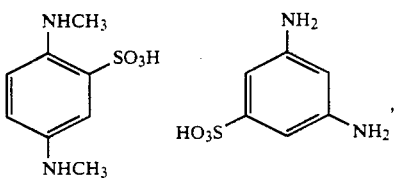

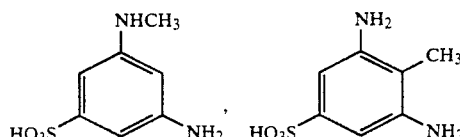

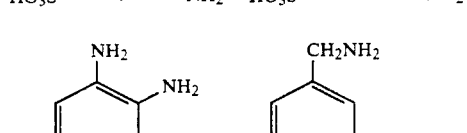

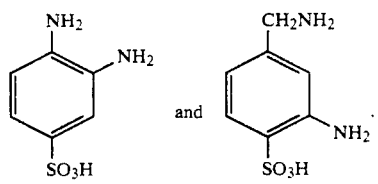

Emphasis must be given to azo reactive dyes of the formula I in which the radical

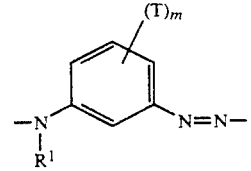

is derived from the following diazo components: 2,4-diaminobenzenesulfonic acid, 2,5-diaminobenzenesulfonic acid or 2,4-diaminobenzene-1,5-disulfonic acid.

Emphasis must further be given to azo reactive dyes of the formula I in which the ring A is not benzofused.

Emphasis must further be given to azo reactive dyes of the formula I in which the radical of the coupling component has the formula

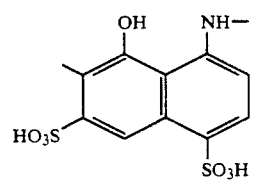

Emphasis must further be given to azo reactive dyes of the formula I in which the sum total of the hydroxysulfonyl radicals or of the hydroxysulfonyl and carboxyl radicals is at least 10, preferably 10 or 11.

Of particular interest are azo reactive dyes which conform to the formula Ia

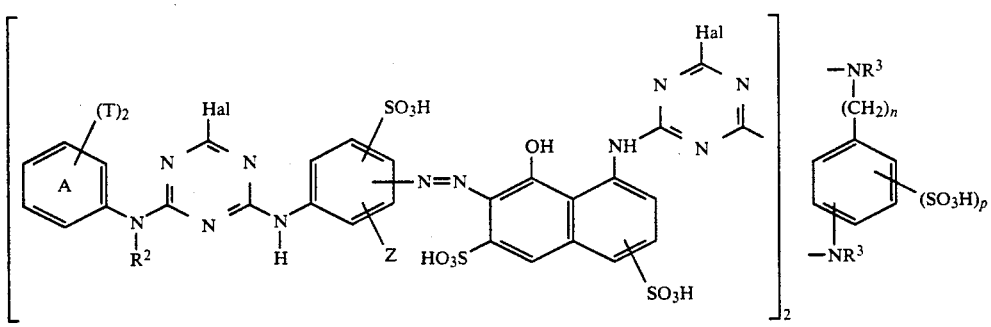

where
R² is hydrogen or methyl,
Z is hydrogen or hydroxysulfonyl, and
n, p, T, R³, Hal and the ring A are each as defined above.

Of particular suitability are azo reactive dyes which conform to the formula Ib

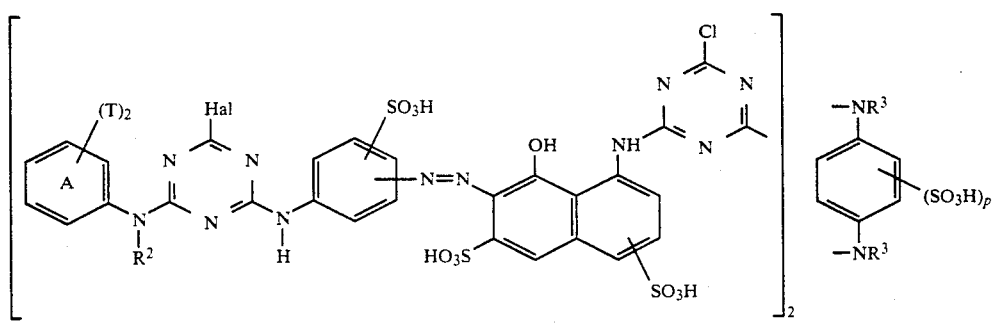

where
R² is hydrogen or methyl,
the ring A may be substituted by chlorine or methyl, and
p, T, Hal and R³ are each as defined above.

Of particular technical interest are azo reactive dyes which conform to the formula Ic

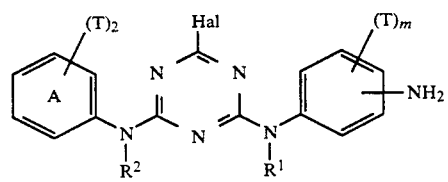

where m, Hal, T, R¹, R² and the ring A are each as defined above, and coupling it to a coupling component of the formula III

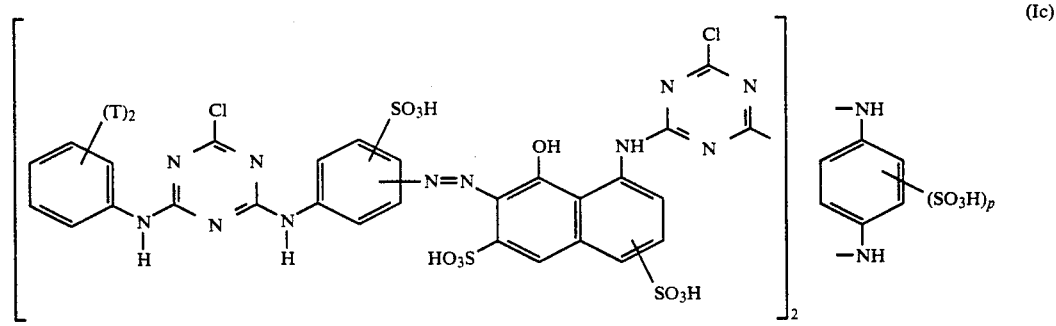

where
T and p are each as defined above.

The novel azo reactive dyes of the formula I are prepared in a conventional manner. For instance
a) by diazotizing an amine of the formula II

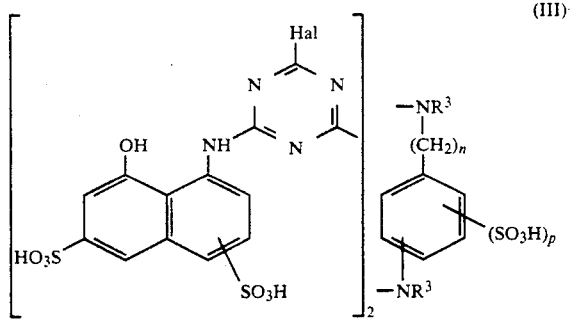

where n, p, R³ and Hal are each as defined above.

A further method comprises for example b) diazotizing an amine of the formula II, coupling it to a coupling component of the formula IV

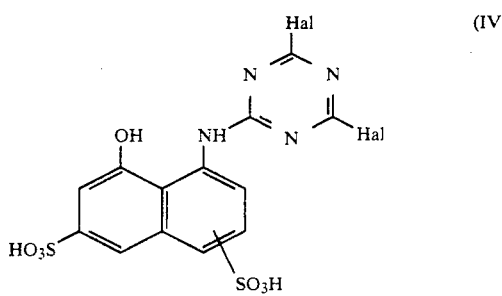

where Hal is as defined above, and then reacting with a diamine of the formula V

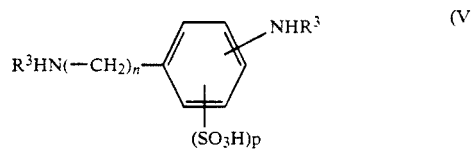

where n, p and R³ are each as defined above.

A further method comprises for example c) Diazotizing an amine of the formula VI

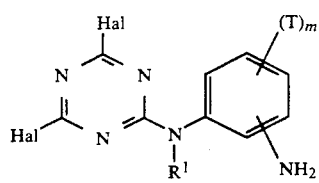

where n, T, R¹ and Hal are each as defined above, coupling it to a coupling component III and then reacting with an arylamine of the formula VII

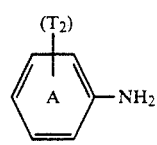

where T and the ring A are each as defined above.

Preferably, the dyes according to the present invention are prepared by method a).

The novel reactive dyes of the formula I are advantageously suitable for dyeing or printing hydroxyl or nitrogen-containing organic substrates. Such substrates are for example leather or fiber material containing predominantly natural or synthetic polyamides or natural or regenerated cellulose. The novel dyes are preferably suitable for dyeing and printing textile material based on cotton.

In this use, they are notable for a low fixation temperature in the exhaust method and for a short fixation time at room temperature in the short-time pad-batch process. They are also free of the defects in wash fastness to which the addition mechanism reactive dyes necessary for such fixing conditions are otherwise prone. The color strength, rate of fixation and light fastness of the novel dyes are very high.

The Examples which follow further illustrate the invention.

EXAMPLE 1 a) A solution of 1.05 mol of 1-amino-8-hydroxynaphthalene-4,6-disulfonic acid (as the disodium salt) in 800 ml of water is added to a suspension of 216 g of cyanuric chloride in 2250 ml of ice-water and 10 ml of 30% strength by weight hydrochloric acid. After three hours' stirring at 0°–5° C. the reaction had ended. 54 g of 1,4-diaminobenzene were added to the dispersion, and the pH was raised to 5 by simultaneously warming to room temperature and metering in ice-cold 20% strength by weight sodium hydroxide solution. The double condensation was completed by stirring for four hours at 35°–40° C. at pH 5. The tetrasodium salt of the formula

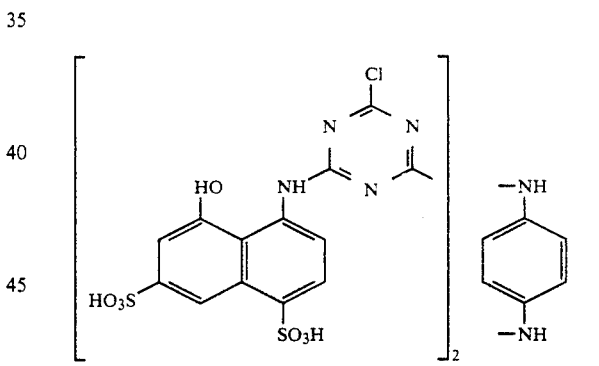

was precipitated from the solution with 1000 g of sodium chloride, filtered off with suction and washed with 3% strength by weight sodium chloride solution. The crude yield was 88% of theory.

b) 0.05 mol of 2-(2,4-dihydroxysulfonylphenylamino)-4-chloro-6-(3-amino-4-hydroxysulfonylphenylamino)-s-triazine was dissolved in 300 ml of ice-water and diazotized with 15 ml of 3.33N sodium nitrite solution and 17 ml of 30% strength by weight hydrochloric acid. After stirring for one hour at ice cold temperatures, the nitrous acid excess was destroyed with sulfamic acid, and the dispersion of the diazonium salt was mixed with the suspension of 0.024 mol of the binary coupling component of a) in 150 ml of water. The coupling reaction was effected by adding 100 ml of saturated sodium acetate solution and sodium bicarbonate to pH 6 and stirring overnight at room temperature. The resulting dye dispersion containing the red dye of the formula:

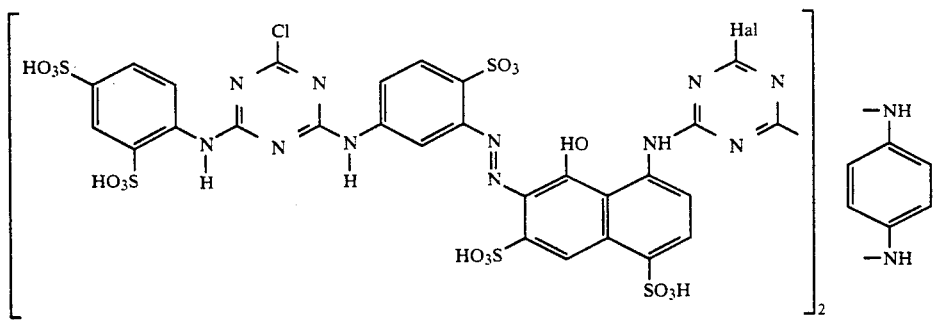

(λ max (water):514.1 nm) as the decasodium salt, was filtered off with suction, washed with 3% strength by weight sodium chloride solution and then with 80% strength by volume aqueous acetone, and dried at room temperature under reduced pressure. Applied to cellulose materials by the cold pad-batch process at room temperature or by the exhaust method at 60° C. the dye produces brilliant, medium-red dyeings having good light and wet fastness properties with a good fixation yield and color strength.

The same method was used to obtain the dyes of the formula

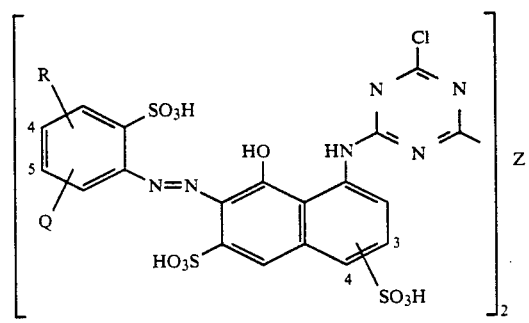

listed in the table below. They have similar properties.

TABLE

| Example No. | Q | R | 3-/4-SO₃H | Z | Hue λ$_{max}$ [nm] in water |
|---|---|---|---|---|---|
| 2 | 4- (HO₃S, HO₃S phenyl)-NH-C(=N)-N(H)-C(Cl)=N-NH— | H | 4 | —NH—(phenyl)—NH— | violet 536 |
| 3 | 4- (HO₃S, SO₃H phenyl)-NH-C(=N)-N(H)-C(Cl)=N-NH— | H | 4 | —NCH₃—(phenyl, SO₃H)—NH— | violet 536 |
| 4 | 4- (HO₃S, SO₃H phenyl)-NH-C(=N)-N(H)-C(Cl)=N-NH— | H | 4 | —NH—(phenyl, SO₃H)—NH— | violet 536 |
| 5 | 4- (HO₃S, SO₃H phenyl)-NH-C(=N)-N(H)-C(Cl)=N-NH— | H | 4 | —NCH₃—(phenyl, SO₃H)—N(CH₃)— | violet 536 |

TABLE-continued

| Example No. | Q | R | 3-/4-SO₃H | Z | Hue λ$_{max}$ [nm] in water |
|---|---|---|---|---|---|
| 6 | 4-(HO₃S)(SO₃H)C₆H₃-NH-C(=N-)-N=C(Cl)-NH- triazine | H | 4 | -NH-C₆H₄(m)-NH- | violet 536 |
| 7 | 5-(SO₃H)(HO₃S)C₆H₃-NH-triazine(Cl) | H | 4 | -NH-C₆H₄(p)-NH- | red 514 |
| 8 | 5-(SO₃H)(SO₃H)C₆H₃-NH-triazine(Cl) | H | 4 | -NH-C₆H₃(SO₃H)-NH- (2-SO₃H, 1,4-diNH) | red 512 |
| 9 | 5-(SO₃H)(SO₃H)C₆H₃-NH-triazine(Cl) | H | 4 | -NH-C₆H₃(SO₃H)-NH- (2-SO₃H, 1,4-diNH) | red 513 |
| 10 | 5-(SO₃H)(SO₃H)C₆H₃-NH-triazine(Cl) | H | 4 | -HN-C₆H₄(m)-NH- | red 512 |
| 11 | 5-(SO₃H)(HO₃S)C₆H₃-NH-triazine(Cl) | H | 4 | -N(CH₃)-C₆H₃(SO₃H)-NH- | red 511 |
| 12 | 5-(SO₃H)(SO₃H)C₆H₃-NH-triazine(Cl) | H | 4 | -N(CH₃)-C₆H₃(SO₃H)-N(CH₃)- | red 514 |
| 13 | 5-(SO₃H)(SO₃H)C₆H₃-NH-triazine(Cl) | H | 4 | -NH-C₆H₃(SO₃H)-NH- (5-SO₃H, 1,3-diNH) | red 513 |

TABLE-continued
| Example No. | Q | R | 3-/4-SO₃H | Z | Hue λ$_{max}$ [nm] in water |
|---|---|---|---|---|---|
| 14 | 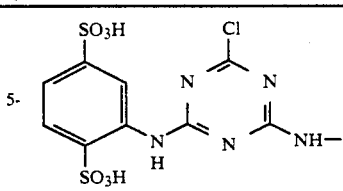 5- | H | 3 | 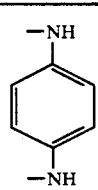 | red 515 |
| 15 | 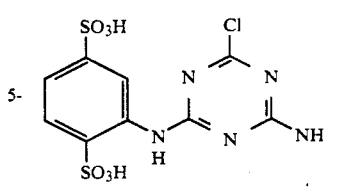 5- | H | 4 | 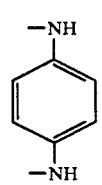 | violet 514 |
| 16 | 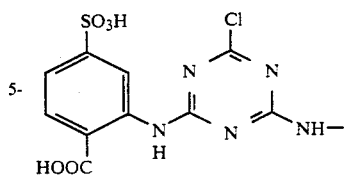 5- | H | 4 | 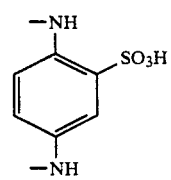 | red 513 |
| 17 | 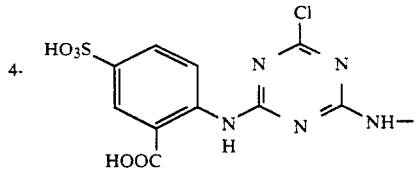 4- | H | 4 | 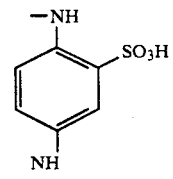 | red 513 |
| 18 | 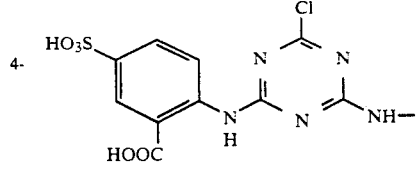 4- | H | 4 | 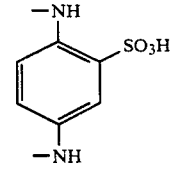 | violet 536 |
| 19 | 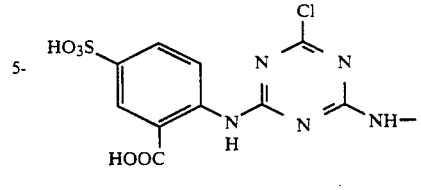 5- | H | 4 | 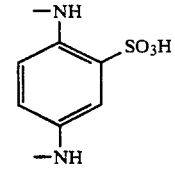 | red 512 |
| 20 | 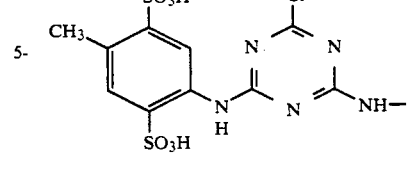 5- | H | 4 | 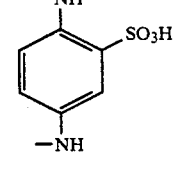 | red 513 |
| 21 | 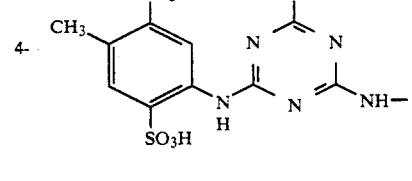 4- | H | 4 | 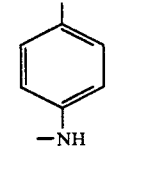 | violet 536 |

TABLE-continued

| Example No. | Q | R | 3-/4-SO₃H | Z | Hue λ$_{max}$ [nm] in water |
|---|---|---|---|---|---|
| 22 | 5- [2-methyl-4,6-disulfophenyl connected via NH to triazine with F and NHCH₃] | H | 4 | -NH-C₆H₄-NH- (1,4-phenylene) | red 515 |
| 23 | 5- [2-chloro-4,5-disulfophenyl connected via NH to triazine with Cl and NHCH₃] | H | 3 | -NH-C₆H₄-NH- (1,4-phenylene) | red 515 |
| 24 | 4- [2-chloro-4,5-disulfophenyl connected via NH to triazine with Cl and NHCH₃] | H | 4 | -NH-C₆H₄-NH- (1,4-phenylene) | violet 536 |
| 25 | 4- [5-chloro-2,4-disulfophenyl connected via NH to triazine with Cl and NHCH₃] | H | 4 | -NH-C₆H₄-NH- (1,4-phenylene) | reddish violet 536 |
| 26 | 5- [5-chloro-2,4-disulfophenyl connected via NH to triazine with Cl and NHCH₃] | H | 4 | -NH-C₆H₄-NH- (1,4-phenylene) | red 514 |
| 27 | 5- [3,6-disulfonaphth-2-yl connected via NH to triazine with Cl and NHCH₃] | H | 4 | -NH-C₆H₃(SO₃H)-NH- | red 513 |
| 28 | 5- [3,6-disulfonaphth-2-yl connected via NH to triazine with Cl and NHCH₃] | 4-SO₃H | 4 | -NH-C₆H₄-NH- (1,4-phenylene) | red 513 |
| 29 | 4- [3,6-disulfonaphth-2-yl connected via NH to triazine with Cl and NHCH₃] | H | 4 | -NH-C₆H₄-NH- (1,4-phenylene) | violet 536 |

TABLE-continued

| Example No. | Q | R | 3-/4-SO₃H | Z | Hue $\lambda_{max}$ [nm] in water |
|---|---|---|---|---|---|
| 30 | 4-sulfo, 5-sulfo naphthyl-NH-C(=N)-N=C(Cl)-N=C-NH— (chlorotriazine-bis-guanidine with 4,8-disulfonaphthylamine) | H | 4 | —NH—C₆H₄—NH— (p-phenylene) | violet 536 |
| 31 | 5-(2,4-disulfophenyl)-NH—C(=N)—N=C(Cl)—N=C—NH— | H | 4 | —NH—CH₂—C₆H₃(SO₃H)—NH— | red 510 |
| 32 | 4-(2,4-disulfophenyl)-NH—C(=N)—N=C(Cl)—N=C—NH— | H | 4 | —NH—CH₂—C₆H₃(SO₃H)—NH— | violet 536 |
| 33 | 4-(2-COOH-4-SO₃H phenyl)-N(CH₃)—C(=N)—N=C(Cl)—N=C—NH— | H | 4 | —NH—C₆H₄—NH— | violet 536 |
| 34 | 5-(2-COOH-4-SO₃H phenyl)-N(CH₃)—C(=N)—N=C(Cl)—N=C—NH— | H | 4 | —NH—C₆H₄—NH— | red 510 |
| 35 | 5-(3-Cl-2-COOH-5-SO₃H phenyl)-NH—C(=N)—N=C(Cl)—N=C—NH— | H | 4 | —NH—C₆H₄—NH— | red 513 |
| 36 | 4-(3-Cl-2-COOH-5-SO₃H phenyl)-NH—C(=N)—N=C(Cl)—N=C—NH— | H | 4 | —NH—C₆H₄—NH— | violet 536 |

EXAMPLE 37

100 g of a cotton yarn were treated in a dyebath containing 1500 ml of water, 2.0 g of the dye of Example 1, 75 g of sodium sulfate and 30 g of sodium carbonate. Starting at 30° C. the temperature was raised to 60° C. in the course of 30 minutes and maintained at that level for 60 minutes.

The yarn was finished in a conventional manner by rinsing and soaping off at the boil to leave a dyeing in a bright reddish violet shade having excellent fastness properties.

EXAMPLE 38

A cotton fabric was impregnated on a three-roll padmangle at room temperature with a dyeing liquor containing per 1000 g of liquor 16 g of the dye of Example 2, 100 g of 38° Be sodium silicate, 50 g of 38° Be sodium hydroxide solution and 100 g of urea.

After impregnation to a wet pickup of 70%, the fabric was rolled up and, after wrapping in plastic sheeting, stored in the moist state at room temperature for 8 hours.

After it had been finished in a conventional manner by rinsing and soaping off at the boil it exhibited a deep dyeing in a brilliant red shade having very good fastness properties.

We claim:

1. An azo reactive dye of the formula

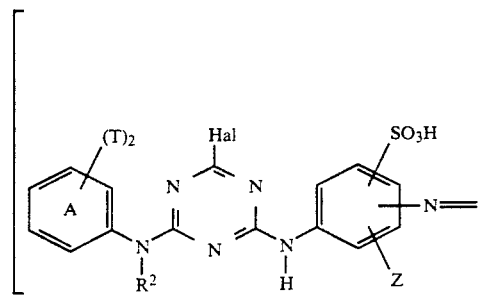

-continued

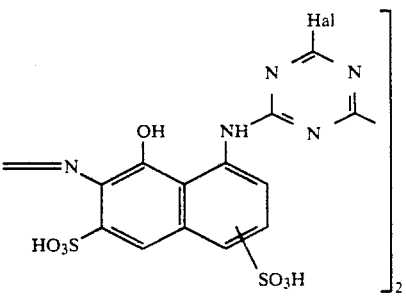

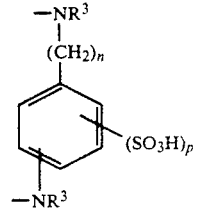

where
R$^2$ is hydrogen,
Z is hydrogen,
n is 0 or 1,
p is 0 or 1,
R$^3$ is hydrogen, methyl or ethyl,
T is carboxyl or hydroxysulfonyl,
Hal is fluorine or chlorine, and
the ring A is unsubstituted or substituted by C$_1$–C$_4$-alkyl, C$_1$–C$_4$-alkoxy or halogen.

2. An azo reactive dye as claimed in claim 1 of the formula

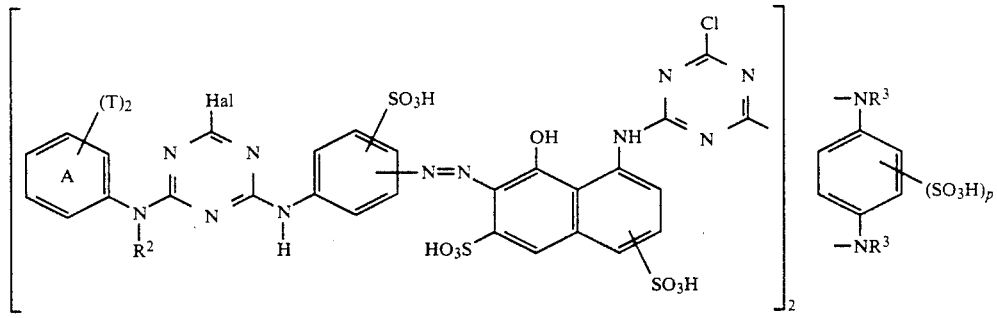

where
the ring A is unsubstituted or substituted by chlorine or methyl, and p, T, Hal and R$^2$ and R$^3$ are each as defined in claim 1.

3. An azo reactive dye as claimed in claim 1, wherein T is hydroxysulfonyl, and n is 0.

* * * * *